Nov. 19, 1957 G. VIGNERI 2,813,467
RECIPROCATING CONCRETE SCREED
Filed June 30, 1955
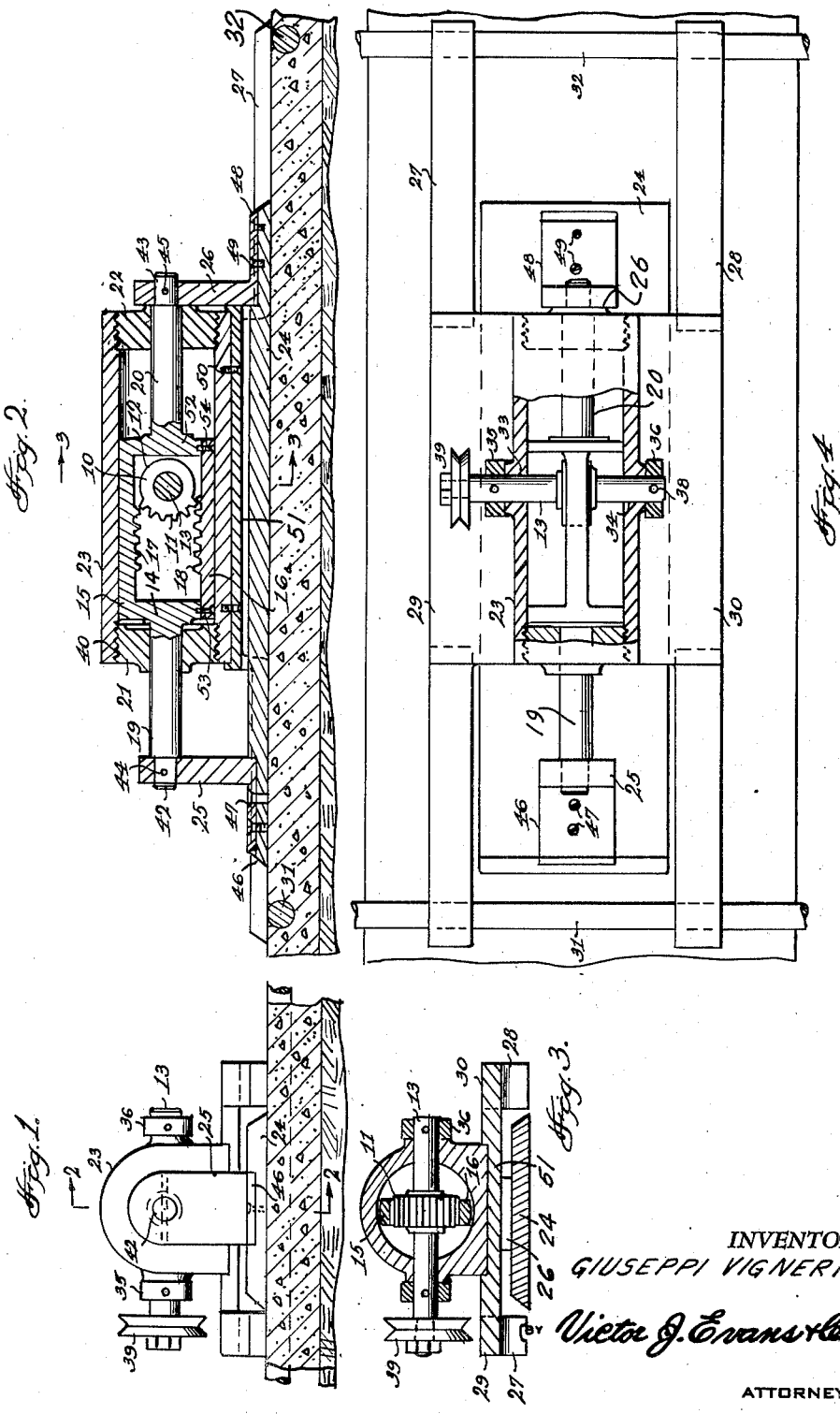
INVENTOR.
GIUSEPPI VIGNERI
ATTORNEYS

2,813,467

RECIPROCATING CONCRETE SCREED

Giuseppi Vigneri, Belleville, N. J.

Application June 30, 1955, Serial No. 519,068

3 Claims. (Cl. 94—45)

This invention relates to mechanical movement and particularly reciprocating action obtained by strip gears, and in particular, a gear segment having teeth in one semi-circular portion and in which the complementary semi-circular portion is smooth whereby with the gear segment positioned between opposed gear racks in a head and rotating continuously the portion having the gear teeth therein meshes with first one gear rack and then the other reciprocating the head and providing means for actuating a slider with a reciprocating action for grading and finishing concrete and the like above which the device is suspended.

The purpose of this invention is to provide a reciprocating action that is adapted to be actuated with a strip gear thereby eliminating eccentric, pitman and other links and connecting arms and making it possible to incorporate all actuating elements in a relatively small common housing.

Reciprocating movements have been used for various purposes and with the conventional type of reciprocating device wherein an arm is pivotally mounted on a pin eccentrically positioned on a disc or wheel the wear is excessive and pivotal connections are required between the arm and eccentrically positioned pin and also between the opposite end of the arm and a smoothing or grading slider. Such devices are necessarily exposed to the elements and when used for grading concrete the exposed bearings are subjected to abuse and consequently wear rapidly. With this thought in mind, this invention contemplates a reciprocating device having a head in the form of a piston positioned in a cylinder with gear racks in opposite sides of the head and positioned to mesh alternately with teeth of a gear segment positioned in the head and rotatably mounted in the cylinder and wherein piston rods extended from ends of the cylinder are adapted to be connected to a slider suspended by rods or tubes over an area in which a slab of concrete is formed.

The object of this invention is, therefore, to provide means for obtaining a reciprocating action with a combination of gear racks and a gear segment positioned in a cylinder with rods extended from ends of the cylinder connected to a shoe or slider and with the gear segment rotated by suitable means.

Another object of the invention is to provide a reciprocating action that is adapted to be applied to various types of devices.

A further object of the invention is to provide a reciprocating action operated by a continuously moving part and adapted to be used for grading concrete and the like in which the device is of a simple and economical construction.

With these and other objects and advantages in view, the invention embodies a cylinder mounted on bars with the parts positioned to slide on rails, a segmental gear extended transversely through and rotatably mounted in the cylinder and having driving means in combination therewith, a traveling head having opposed gear racks therein slidably mounted in the cylinder and having connecting rods extended from ends thereof through ends of the cylinder, said segmental gear being positioned to mesh, alternately, with the gear racks of the head, a slider extended below the cylinder, and means connecting extended ends of the rods to the slider whereby the slider is adapted to be reciprocated for grading and smoothing concrete and the like.

Other features and advantages of the invention will appear from the following description, taken in connection with the drawing, wherein:

Figure 1 is an end elevational view of the improved reciprocating grader.

Figure 2 is a longitudinal section through the grader taken on line 2—2 of Figure 1.

Figure 3 is a cross section through the grader taken on line 3—3 of Figure 2.

Figure 4 is a plan view of the improved reciprocating device with part of the cylinder broken away and part shown in section illustrating the mounting of the transversely disposed segmental gear carrying shaft and showing the shaft extended through the reciprocating head of the cylinder.

Referring now to the drawing, wherein like reference characters denote corresponding parts, the improved reciprocating action of this invention includes a segmental gear 10 having teeth 11 on one side and a smooth surface 12 on the opposite side, a shaft 13 upon which the gear is mounted, a head 14 having oppositely disposed sections 15 and 16 with teeth 17 extended from the inner surface of the section 15 and teeth 18 on the inner surface of the section 16, rods 19 and 20 extended from opposite ends of the head 14 through heads 21 and 22 of a cylinder 23, a slider 24 connected by brackets 25 and 26 to extended ends of the rods 19 and 20, bars 27 and 28 extended from flanges 29 and 30 at the sides of the cylinder 23 and rails 31 and 32 upon which the bars 27 and 28 are adapted to slide.

The shaft 13 is rotatably mounted in bearings 33 and 34 in the sides of the cylinder 23 and the shaft is retained in position longitudinally with set collars 35 and 36 that are retained in position with screws 37 and 38, respectively. The shaft 13 is adapted to be rotated by hand, however, one end of the shaft is provided with a pulley 39 over which a belt of a motor or the like may be trained when it is desired to rotate the shaft by power, such as by a motor, engine, or the like. The segmental gear 10 is secured to the shaft 13 by a conventional key or by other suitable means and, as shown in Figure 2, the heads 21 and 22 are secured in the ends of the cylinder by threads 40 and 41 or by other means.

The ends of the rods 19 and 20, extended from opposite ends of the head or piston 15, are provided with pins 42 and 43 of reduced diameter and the pins are secured in the brackets 25 and 26 with screws or pins 44 and 45, respectively.

A flange 46 on the lower end of the bracket 25 is secured to the slider 24 with screws 47 and a similar flange 48 of the bracket 26 is secured to the opposite end of the slider with similar screws 49.

The bars 27 and 28, which are secured to flanges 29 and 30 at the sides of the cylinder 23, are connected to the cylinder with screws 50 which extend through a web 51, connecting inner edges of the flanges and bars, and the screws are threaded into the lower side of the cylinder, as shown in Figure 2.

The bars 15 and 16 on the inner surfaces of which the gear racks or teeth 17 and 18 are positioned extend between the head 14 and a disc 52, and the bar 16, which is adapted to be removed to facilitate assembling is secured in position by a screw 53 which is threaded in the head 14 and a screw 54 that is threaded in the disc 52, as shown in Figure 2.

The slider 24 is positioned between bars 27 and 28 at the sides of the plate 51 and with the slider spaced from inner surfaces of the bars 27 and 28 the slider is adapted to travel longitudinally as the shaft 13 is rotated by a motor or the like.

With the uper surfaces of the rails 31 and 32 positioned in a plane corresponding with the surface of a floor or the like to be formed with the device the bars are adapted to travel on the rails, grading and smoothing concrete or other material over which the device is passing.

In operation and with the device used for grading or leveling concrete or other suitable materials, the rails 31 and 32 are positioned with the upper surfaces thereof corresponding with the upper surface of a slab to be formed of concrete or the like and as the concrete is positioned below the device the bars 27 and 28 upon which the complete unit is mounted are drawn over the rails whereby with the pulley 39 connected to a suitable power source the slider 24 is reciprocated longitudinally working the aggregate or upper portion of the concrete into a substantially level and smooth position.

It will be understood that modifications, within the scope of the appended claims, may be made in the design and arrangement of the parts without departing from the spirit of the invention.

What is claimed is:

1. A reciprocating screed comprising a housing, a segmental gear having teeth positioned on a semi-circular portion thereof rotatably mounted in the housing, a similar portion at the opposite side of the gear being smooth, a head having opposed gear racks therein positioned in the housing with the gear racks on opposite sides of the segmental gear and adapted to, alternately, mesh therewith, a slider positioned below the housing, means connecting the slider to the head, and means for supporting the housing above an area for grading concrete and the like in said area.

2. In a reciprocator, the combination which comprises a pair of spaced stationary support bars, a plate mounted on the support bars, a cylindrical housing mounted on the plate and positioned midway between the support bars, a head having an opening therethrough slidably mounted in the cylindrical housing, the head having teeth therein and the teeth being positioned in opposite sides of the opening, the head also having aligned rods extended from ends thereof and the rods extending from ends of the cylindrical housing, brackets carried by and depending from ends of the rods, a slider positioned below the plate and cylindrical housing and secured to lower ends of the brackets, a shaft extended transversely through the cylindrical housing and opening in the head slidably mounted therein, a segmental gear having teeth on a semi-circular portion thereof mounted on the shaft, and means by which the shaft may be rotated.

3. In a reciprocating device, the combination which comprises a pair of rails, a pair of longitudinally disposed bars mounted on the rails, a plate mounted on the bars, a cylindrical housing mounted on the plate and positioned midway between the bars, a head having an opening therethrough with teeth in the sides and positioned in the opening slidably mounted in the cylindrical housing, the head having aligned rods extended from ends thereof and said rods also extended through ends of the cylindrical housing, the extended ends of the rods having depending brackets mounted thereon, a slider secured to lower ends of said brackets and extended below the plate and cylindrical housing, a shaft rotatably mounted in the cylindrical housing and extended through the opening of the head, a segmented gear having teeth in a semi-circular portion thereof mounted on the shaft and positioned in the opening of the head whereby the teeth thereof alternately engage the teeth in opposite sides of the opening through the head, and means on an end of the shaft by which the shaft may be rotated.

References Cited in the file of this patent

UNITED STATES PATENTS

| 1,362,901 | Simonton | Dec. 21, 1920 |
| 1,399,666 | Short | Dec. 6, 1921 |
| 1,818,313 | Everts | Aug. 11, 1931 |
| 2,018,294 | Baily | Oct. 22, 1935 |

FOREIGN PATENTS

| 435,590 | Great Britain | Sept. 24, 1935 |